United States Patent

[11] 3,607,819

| [72] | Inventors | Joseph A. Beckman<br>Akron;<br>Jerry Donald Hunt, Cuyahoga Falls, both of Ohio |
|---|---|---|
| [21] | Appl. No. | 833,687 |
| [22] | Filed | June 16, 1969 |
| [45] | Patented | Sept. 21, 1971 |
| [73] | Assignee | The Firestone Tire & Rubber Company<br>Akron, Ohio |

[54] BUTADIENE-STYRENE COPOLYMER INTERCONNECTED WITH SILICON OIL-EXTENDED AND STABILIZED
2 Claims, No Drawings

[52] U.S. Cl. .................................................. 260/33.6 AQ,
260/23.7 M, 260/45.85 R
[51] Int. Cl. .................................................. C08d 11/04
[50] Field of Search ....................................... 260/83.7,
85.1, 23.7 M, 33.6 AD, 45.85, 462 R

[56] References Cited
UNITED STATES PATENTS

| 3,281,383 | 10/1966 | Zelinski et al. ............... | 260/23.7 |
| 3,488,309 | 1/1970 | Cockbain ..................... | 260/23.7 |

OTHER REFERENCES

Journal of the Indian Chemical Society, Vol. 38, No. 1, 1961 pp. 2,3,4 and 6 Article entitled: Organic Derivatives of Boron Part I Synthesis by Alcohol Interchange Technique by Mehrotra et al.

*Primary Examiner*—Donald E. Czaja
*Assistant Examiner*—V. P. Hoke
*Attorneys*—S. M. Clark and Gordon B. Seward

ABSTRACT: An unvulcanized interconnected linear rubbery polymer of conjugated dienes of 4 and 5 carbon atoms and copolymers thereof with olefins, preferably oil diluted, is stabilized by the reaction product of boric acid and salicylic acid.

BUTADIENE-STYRENE COPOLYMER INTERCONNECTED WITH SILICON OIL-EXTENDED AND STABILIZED

This invention relates to stabilizers for rubbery stereoregular homopolymers of conjugated diolefins of 4 and 5 carbon atoms and copolymers thereof with olefins, and more particularly the rubbery copolymer of butadiene and styrene, and especially the unvulcanized, oil-diluted interconnected (or jumped) polymers.

The term "polymer" is used herein to include homopolymers and copolymers.

The stabilizer of this invention is the reaction product of one mole of boric acid with 1 or 2 moles of salicylic acid. From 0.005 to 5 phr. (parts per hundred parts of the polymer) will be used and preferably 0.1 to 2 phr.

Unvulcanized interconnected rubbery polymers are those in which the viscosity and molecular weight have been jumped or otherwise substantially increased by reaction of the initially produced linear polymer with a suitable reagent to increase the molecular weight and at the same time the branching to the polymer. One type of such reaction is exemplified by the reaction of silicon tetrachloride with a live polybutadiene produced by polymerization of butadiene in a nonaqueous system by means of lithium-based catalyst (e.g. butyllithium or tetramethylene dilithium), the interconnected polymer containing a silicon atom in the center with four hydrocarbon polymer fragments extending therefrom to form a "star." Another type of such interconnecting reaction, termed "jumping," is exemplified by the procedure described by E. F. Engel et al., RUBBER AGE, Dec. 1964, pages 410–415; any unsaturated rubbery polymer can be jumped by treatment with a two-part catalyst consisting of a Friedel-Crafts catalyst plus a cocatalyst, such as titanium tetrachloride and thionylchloride or ethyl-aluminum sesquichloride and water.

Another type of molecular-weight-increasing reaction or interconnecting (jumping) reaction, is exemplified by the reaction of an olefinically unsaturated rubbery polymer with a halogenated organic compound (e.g. ethylene dichloride) in the presence of a strong base (e.g. butyllithium) to produce a mixture of higher molecular weight rubbery polymers of branched construction, and, typically, exemplified by a mixture of polymers having a molecular weight distribution including the original molecular weight of the unreacted rubbery polymer to molecular weights of dimers, trimers, tetramers and higher polymers of the original rubbery polymer. All of these polymers of increased molecular weight contemplated by the invention have improved ability to accept diluting oil and possess good milling and extruding properties ("processing" properties) when extended with oil. From 10 to 100 parts of processing oil, or thereabout may be added to 100 parts of the polymer.

Difficulty has been experienced in stabilizing many oil-diluted rubbery polymers. The stabilizer of this invention provides excellent stabilization of unvulcanized oil-diluted interconnected rubbery polymers, i.e. an unvulcanized linear rubbery polymer which has been interconnected and oil diluted. The invention finds widest use in the stabilization of such copolymers of butadiene and styrene but is useful with other interconnected rubbery polymers, and particularly those derived from the polybutadienes, polyisoprenes and butadiene-isoprene copolymers of any stereo composition. Polymers suitable for use in the interconnecting reaction can be conveniently made by the methods of U. S. Pat. No. 3,317,918, for example.

Any of the oils commonly used in the dilution of rubbers can be employed, including particularly higher boiling petroleum fractions such as the commercially known naphthenic and aromatic mineral oils. In the dilution of rubbers with oils, about 37.5 parts of oil are customarily used with 100 parts of polymer, although the amount of oil can vary from 10 to 100 parts, more or less. The oil preferably is added to the polymer after the polymerization and interconnecting reactions are completed. The Stabilizer can be added prior to the addition of the oil, it can be added with the oil, or it can be added soon thereafter.

The stabilizer is incorporated into the polymer in the usual manner. The stabilizing effect is recognized by the lessening of the decrease in the viscosity of the polymer on heat aging. The stabilizers are added to protect the polymer during storage and processing. The vulcanizates are useful wherever rubber vulcanizates have been employed, as in the manufacture of tires, hose, and a wide variety of products.

The polymer used in the tests recorded in the following table was prepared by reaction of $SiCl_4$ with live butadiene-styrene copolymer obtained through continuous nonaqueous polymerization utilizing butyllithium as a catalyst. A polymer cement-oil masterbatch was prepared containing 37.5 parts of processing oil per 100 parts of polymer, and the stabilizers of this invention were added to portions of the masterbatch to produce the samples for aging studies.

These masterbatch samples were desolventized on a drum drier. Each dried polymer masterbatch sample was milled to achieve homogeniety and samples of the appropriated size were cut from each of the milled polymers. A Mooney viscosity (Ml/4/212° F.) determination was made on each sample prior to aging. Samples containing the various stabilizers were then aged in a forced air oven at 75° for various periods of time. The results obtained with the different stabilizers of this invention are recorded in the following table.

Tests were made on polymers recovered from the reaction cement in two different ways, viz (1) by pouring the reaction cement on to a drum heated to 162° C. to volatilize the solvent and thus recover the polymer, and (2) by pouring the cement into steam-heated water and subsequently removing the solvent by distillation. Tests were made on both polymers by preparing polymer containing no stabilizer and polymer containing a commercial stabilizer, in both ways, and then adding 0.5 phr. of each stabilizer to each polymer, and the following table is divided into two parts, accordingly. The stabilizers were made by the reaction of 1 and 2 moles, respectively, of salicylic acid with 1 mole of boric acid. The results are given in the following table.

The stabilizers may be prepared in any usual way, as by reacting a borate ester with salicylic acid. See ORGANIC DERIVATIVES OF BORON. PART I. SYNTHESIS BY ALCOHOL INTERCHANGE TECHNIQUE by Mehrotra and Srivastava, Journ. Indian Chem. Soc., Vol. 38, No. 1, 1961, pages 1–6.

TABLE

|  | Percent retention of mooney viscosity (ML/4/212° F. after aging) | | | |
| --- | --- | --- | --- | --- |
|  | 1 day | 2 days | 3 days | 4 days |
| Tests on drum-dried polymer: | | | | |
| No stabilizer | 84 | 71 | 63 | 80 |
| Commercial stabilizer | 94.0 | 91.5 | 93.5 | 98.0 |
| 0.5 phr. 1:1 reaction product of boric acid and salicylic acid | 104.2 | 104.2 | 97.9 | 85.5 |
| 0.5 phr. 1:2 reaction product of boric acid and salicylic acid | 104.0 | 100.0 | 93.0 | 83.6 |
| Tests on water-desolventized polymer: | | | | |
| No stabilizer |  | 82.5 |  | 73 |
| Commercial stabilizer | 90.9 | 89.4 | 83.3 | 77.3 |
| 0.5 phr. 1:1 reaction product of boric acid and salicylic acid | 96.5 | 94.7 | 91.3 | 85.9 |
| 0.5 phr. 1:2 reaction product of boric acid and salicylic acid | 88.3 | 88.3 | 83.3 | 73.4 |

The test results show that, although the stabilizers act somewhat differently on the two polymers, they show substantial improvement over the polymers containing no stabilizer and approach or improve upon the results obtained with the commercial stabilizer.

The stabilized oil-diluted polymers of the invention are useful in practically every instance in which conventional oil-diluted SBR, oil-diluted natural rubber and oil-diluted rubbery polymers have been useful, including, without limitation, use in pneumatic tire treads, sidewalls and carcass stocks. Also the stabilized polymers of the invention can be blended with other known polymers to provide useful commercial compositions for fabrication into useful shapes and articles. The stabilized polymers of the invention are advantageously blended with known rubbers (e.g. natural rubber, polybutadienes, polyisoprenes, butadiene-styrene copolymer, isoprene-isobutylene copolymer, polychlorprene, isoprene-styrene copolymer) with or without additional oils, for forming vulcanizates of great technical importance. The novel stabilized polymers are advantageously mixed with the known reinforcing carbon blacks to produce useful commercial stocks, which also can contain one or more additional rubbery polymers, and also can contain 5 to 100 phr. of additional oil or plasticizer. Sulfur and other known vulcanizing agents for natural rubber and the commercial synthetic rubbers are useful for forming vulcanizable stocks containing the novel stabilized polymer. Known methods of mixing, forming, fabricating and curing or vulcanizing compositions of natural and commercial synthetic rubbers are applicable to and useful with compositions containing the novel stabilized polymers of the invention. The novel polymers are especially useful in pneumatic tire tread, sidewall and carcass compositions, and the considerations of this paragraph are especially relevant to the use of the novel polymers in tires.

We claim:

1. Butadiene-styrene copolymer units interconnected through silicon and the resulting interconnected copolymer being extended with 10 to 100 parts of processing oil per 100 parts of the interconnected copolymer, which interconnected copolymer is unvulcanized and is stabilized with 0.005 to 5 parts of stabilizer per 100 parts of interconnected copolymer, which stabilizer is a reaction product of 1 or 2 moles of salicylic acid and 1 mole of boric acid.

2. The composition of claim 1 in which the interconnected copolymer is extended with substantially 37.5 parts of processing oil.

PO-1050
(5/69)

UNITED STATES PATENT OFFICE
CERTIFICATE OF CORRECTION

Patent No. 3,607,819      Dated September 21, 1971

Inventor(s) Joseph A. Beckman and Jerry Donald Hunt

It is certified that error appears in the above-identified patent and that said Letters Patent are hereby corrected as shown below:

Col. 1, line 20, "to" should read --of-- line 24 should read as follows:

--system by means of a lithium-based catalyst (e.g. butyllithium or--

Col. 2, line 18 "appropriated" should read --appropriate-- line 20, "(M1/4/212° F.)" should read --(ML/4/212° F.)-- line 22, "75°" should read --75° C.--

Signed and sealed this 11th day of April 1972.

(SEAL)
Attest:

EDWARD M. FLETCHER, JR.
Attesting Officer

ROBERT GOTTSCHALK
Commissioner of Patents